United States Patent [19]

Ishiodori

[11] 4,015,076
[45] Mar. 29, 1977

[54] NOISE ELIMINATING CIRCUIT FOR VIDEO TELEVISION SIGNAL
[75] Inventor: Makoto Ishiodori, Atsugi, Japan
[73] Assignee: Sony Corporation, Tokyo, Japan
[22] Filed: June 9, 1975
[21] Appl. No.: 584,822
[30] Foreign Application Priority Data
June 17, 1964 Japan .................. 39-70464[U]
[52] U.S. Cl. .............. 358/167; 178/DIG. 12; 358/8
[51] Int. Cl.$^2$ .......................... H04N 5/21
[58] Field of Search ........ 178/6, 6.8, 7.1, 7.2, 178/DIG. 12; 358/8

[56] References Cited
UNITED STATES PATENTS

| | | | |
|---|---|---|---|
| 3,288,930 | 11/1966 | Johnson | 178/DIG. 12 |
| 3,333,055 | 7/1967 | Krause | 178/DIG. 12 |
| 3,715,477 | 2/1973 | Olson et al. | 178/DIG. 12 |

FOREIGN PATENTS OR APPLICATIONS

| | | | |
|---|---|---|---|
| 685,483 | 1/1953 | United Kingdom | 178/DIG. 19 |

OTHER PUBLICATIONS
Electronics, pp. 118–122, Dec. 1947.

*Primary Examiner*—Robert L. Richardson
*Attorney, Agent, or Firm*—Lewis H. Eslinger; Alvin Sinderbrand

[57] ABSTRACT

A high frequency band signal is separated from a demodulated video signal and then is supplied to a noise clipping circuit in which black peak portions of the signal exceeding a predetermined black signal level are clipped.

The resulting clipped output is combined with a low frequency band signal also separated from the demodulated video signal by which a negative going overshoot noise caused at the beginning of the horizontal blanking period is eliminated, and accordingly the signal to the noise ratio is improved and disturbance of synchronization is avoided.

8 Claims, 9 Drawing Figures

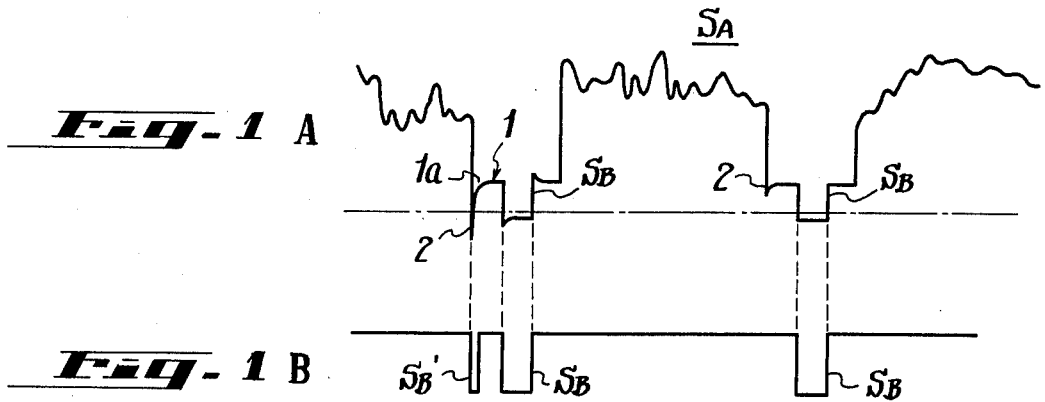
Fig-1 A
Fig-1 B
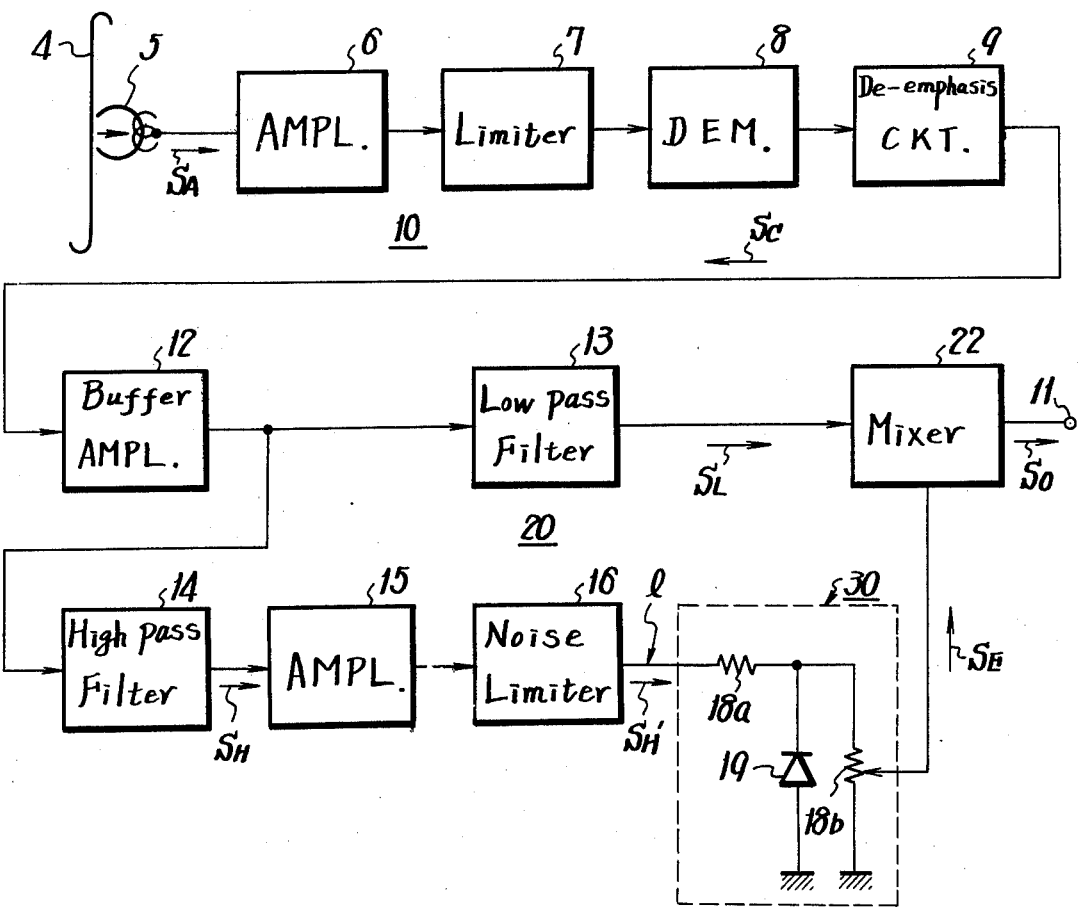
Fig-2

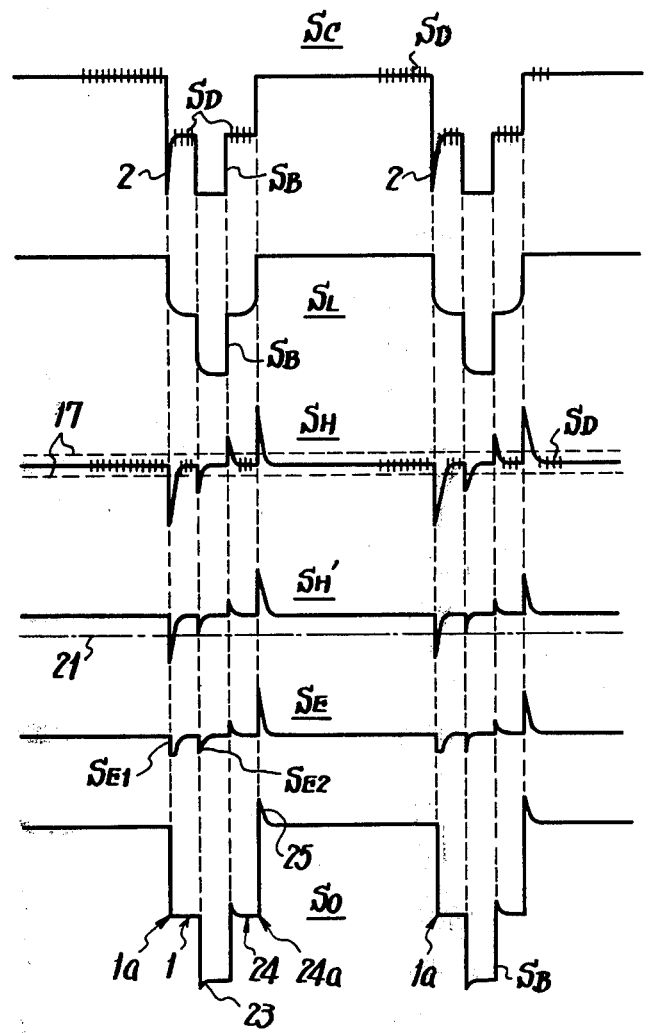

NOISE ELIMINATING CIRCUIT FOR VIDEO TELEVISION SIGNAL

BACKGROUND OF THE INVENTION

1. Field of the Invention

The present invention relates generally to a noise eliminating circuit for video television signals, and is directed more particularly to a noise eliminating circuit for video television signals which is particularly suited for use with a magnetic recording and/or reproducing apparatus, such as, a video tape recorder.

2. Description of the Prior Art

In general, when a monochrome or color video television signal recorded on a magnetic tape or sheet is reproduced by a reproducing magnetic head, the resulting reproduced signal is transmitted to an output terminal through a reproducing circuit which includes components, such as a limiter, an FM-demodulator and so on, which have non-linear characteristics, so that the reproduced video signal is distorted, and especially its high frequency band components are emphasized unnecessarily. More particularly, as a result of high frequency band compensation, an overshoot noise directed to the black level side is produced at the front porch of the horizontal blanking period, and this overshoot noise and the horizontal synchronous pulse can not be distinguished from each other in the video signal reproducing circuit loop, with the result that a disturbance in synchronization may occur.

In general, in the above described reproducing circuit for a video signal, there is usually provided a de-emphasis circuit. Since this de-emphasis circuit corresponds, in circuit operation, to a pre-emphasis circuit which is provided in the recording circuit and serves to prevent high frequency band components of the video signal from being affected by noises in the recording circuit during the recording operation, the de-emphasis circuit cannot compensate for the overshoot noise produced by the components with non-linear characteristics and a disturbance in synchronization may occur.

SUMMARY OF THE INVENTION

Accordingly, it is an object of this invention to provide a noise eliminator applied to a video signal reproducing circuit of a video tape recording and/or reproducing apparatus and by which the mentioned overshoot noise is eliminated to prevent possible disturbance in synchronization.

According to an aspect of this invention there is provided a noise eliminating circuit for a reproduced video television signal, in which the video signal is divided into high and low frequency band components, and a clipped output which is obtained by clipping signal components of the high frequency band components exceeding a predetermined black peak level thereof is added to the low frequency band components to eliminate especially the overshoot at the side of the black level or to shape the waveform of the reproduced video signal so as to correspond to that of the original signal.

The above, and other objects, features and advantage of this invention, will become apparent from the following description taken in conjunction with the accompanying drawings.

BRIEF DESCRIPTION OF THE DRAWINGS

FIGS. 1A and 1B are respectively waveform diagrams of a video signal and of synchronizing signals separated therefrom, and to which reference will be made in explaining problems encountered in the operation of the prior art circuit;

FIG. 2 is a schematic diagram showing an embodiment of a noise eliminating circuit according to this invention; and FIGS. 3A to 3F, inclusive, are waveform diagrams to which reference will be made in explaining the operation of the circuit according to this invention.

DESCRIPTION OF THE PREFERRED EMBODIMENT

Before describing the present invention, the problem to be overcome thereby will be explained with reference to FIGS. 1A and 1B.

In the prior art, as shown at the left hand portion of FIG. 1A, a front edge $1a$ of a front porch 1 of a reproduced video signal $S_A$ is overshot to the black level side referred to as 2. If the reproduced video signal $S_A$ having the overshoot portion 2 is used, as it is, that is, without wave-shaping the same, as the video signal applied to a video monitor, the overshoot portion 2 is separated for example, by the synchronous separation circuit provided for detecting or separating the synchronous signal $S_B$ in the monitor or receiver, so that a false synchronous signal $S_B$ (FIG. 1B) is separated in addition to the true synchronous signal $S_B$, and hence there is the possibility that a disturbance in synchronization may occur.

A description will now be given of an embodiment of the present invention with reference to FIG. 2 in which the invention is shown applied to the signal reproducing circuit of a magnetic recording and/or reproducing apparatus which, by way of example, is also provided with a noise limiter circuit.

In FIG. 2, reference numeral 10 designates the usual reproducing circuit of an ordinary magnetic recording and/or reproducing apparatus for transmitting the video signal $S_A$ which is reproduced from a magnetic tape 4 by a reproducing magnetic head 5. As shown, in such reproducing circuit 10, the video signal $S_A$ reproduced by the magnetic head 5 and which may have the configuration shown at the right-hand portion of FIG. 1A, is fed through a signal reproducing amplifier 6 and a limiter 7 to a demodulator 8 which carries out the well known demodulating operation. As a result of the high frequency band compensation in circuit 10, the output of demodulator 8 has overshoot noise, indicated at 2 on FIG. 3A, directed to the black level side at the front porch of each horizontal blanking period. The demodulated signal $S_C$ obtained demodulator 8 from is fed to a de-emphasis circuit 9 which carries out the low band compensation for the demodulated signal applied thereto, and then the resulting signal is transmitted through a noise eliminator 20 according to this invention to an output terminal 11.

In the noise eliminator 20 according to the present invention, the demodulated signal $S_C$ (FIG. 3A) derived from the video signal $S_A$ and including the overshoot portion 2 as divided into a low frequency band component $S_L$ and a high frequency band component $S_H$ (FIGS. 3B and 3C) after passing through a buffer amplifier 12. More specifically output from the buffer amplifier 12 is fed to a low pass filter 13 through which passes the low frequency band component $S_L$ which has almost no noise component $S_D$, and the buffer amplifier output is also fed to a high pass filter 14 through which the high frequency band component $S_H$ passes. The high frequency band component $S_H$ is supplied through an amplifier 15 to a noise limiter 16 which produces a high frequency band component $S_H'$ with almost no noise component $S_D$, as shown in FIG. 3D. The noise limiter 16 a kind of slicer which consists of two diodes (not shown) connected parallel with each other in opposite polarities. In FIG. 3C, dotted lines 17 represent the slice levels for eliminating the noise component $S_D$. The high band component $S_H'$ is then supplied to a clipping circuit 30 which, as shown, consists of a fixed resistor 18a and a variable resistor 18b connected in series to a signal transmission line l and a diode 19 for clipping the black peak level which is connected in parallel to the variable resistor 18b with its anode being grounded. The clipping level for the black level side of high band component $S_H'$ is determined by the resistance values of the resistors 18a and 18b in consideration of the forward voltage drop across the diode 19. The one-dot chain line 21 on FIG. 3D represents the clipping level which is selected so that signal components lower than the peak level of the horizontal synchronous pulses are clipped. Accordingly, at the output side of the variable resistor 18b there is obtained a so-called clipped output signal $S_E$ (FIG. 3E) which results from clipping the parts of the high band components $S_H'$ at the black level side. The clipped output signal $S_E$ is supplied to a mixer 22 which is also supplied with the low band component $S_L$ from low pass filter 13 and which mixes the clipped signal $S_E$ with component $S_L$ to provide an output video signal $S_O$ (FIG. 3F).

In the low band component $S_L$, the portion in the vicinity of the front edge 1a of the front porch 1 is not sharp that is, is curved, as shown on FIG. 3B, so that, when the clipped shoot portion $S_{E1}$ of the clipped output signal $S_E$ corresponding to the front edge 1a of the front porch 1 and which is at the black level side of the video signal (FIG. 3E) and has its level determined by variable resistor 18b, is added to the low band component $S_L$, the distortion or curvature at the front edge 1a is just cancelled by the clipped shoot portion $S_E'$. As a result, the front porch 1 of the output video signal $S_O$ obtained at the output terminal 11 from the mixer 22 has substantially flat characteristics even at its front edge 1a and the overshoot portion 2 shown in FIG. 1A is eliminated, as shown on FIG. 3F. Thus, unnecessary high frequency noises are eliminated.

Since a shoot portion $S_{E2}$ of the signal $S_E$ corresponding to a shoot portion in the high band component $S_H$ at the front edge of the synchronous signal $S_B$ is not clipped or is clipped very small, little, such shoot portion $S_{E2}$ more than cancels the curvature at the corresponding portion of low band component $S_L$ so that a very small an overshoot portion 23 appears in the output signal $S_O$, as shown in FIG. 3F. Similarly, at a back edge 24a of a back porch 24 in the signal $S_O$ there appears an overshoot portion 25 to the white level side. However, even if the overshoot portions 23 and 25 exist in the output video signal $S_O$, they are positioned at the front edge of the synchronous signal $S_B$ and at the side of the white level, respectively. Accordingly, they do not act as the false synchronous signals during synchronous signal separation, and hence a video picture produced from the video signal $S_O$ is not affected thereby. Since the existence of the overshoot portion 25 implies the fact that the high band component is compensated for, the rising up from the black level to the white level in each period between successive blanking periods, that is, during each the picture period of the television signal is accentuated, as in the case where a crisping circuit is provided. Accordingly, it serves as a so-called aperture correction on a monitor television receiver, so that the contour of a reproduced picture becomes clear or sharp, which is of course desired.

As is apparent from the above, with the circuit 20 according to the present invention, the false synchronous signal $S_B'$ (FIG. 1B) caused by the overshoot portion 2 does not appear in the output signal $S_O$, so that the disturbance of synchronization caused by the above overshoot can be eliminated positively with a circuite of relatively simple construction. Further, such circuit in addition to eliminating the disturbance of synchronization, effects a kind of aperture correction on a monitor television receiver, so that the contour of a reproduced picture on the television receiver becomes clearer or is accentuated, as mentioned above. Therefore, the circuit according to the present invention is preferred for use in a video tape recorder as mentioned previously.

Further, in the embodiment of the invention shown in FIG. 2, the circuit 20 includes the noise limiter 16 in the channel or circuit portion handling the high band component $S_H$ so that, the noise components $S_D$ can be eliminated at the same time.

Of course, the main object of this invention is to wave-shape the video signal $S_A$ to a predetermined waveform so as to eliminate the distortion of the video signal $S_A$, so that the present invention can also be applied in a circuit where the above mentioned noise eliminator 16 is omitted and the high band component $S_H$ is directly supplied to the clipping circuit 30 from amplifier 15.

In the above described embodiment, the circuit of the present invention incorporated in the reproducing circuits of a magnetic recording and/or reproducing apparatus, but the same effect can be achieved when the circuit of the invention is incorporated in the recording circuits of the magnetic recording and/or reproducing apparatus.

In the above description, the positive video signal $S_A$ is dealt with as an example, but it will be obvious that the circuit of the present invention may be applied with the same effect in the case of the negative video signal.

Having described a specific embodiment of the invention, it will be apparent that many modifications and variations could be effected therein by one skilled in the art without departing from the spirits or scope of the invention as defined in the appended claims.

I claim as my invention:

1. A noise eliminating circuit for video television signals having synchronous denoting signals comprising:
   a. a low pass filter through which a substantially low frequency band component of said video television signals is passed;
   b. a high pass filter through which a substantially high frequency band component of said video television signals is passed;
   c. a signal clipping circuit connected to said high pass filter by which black peak signals over a predetermined black signal level are clipped from said high frequency band component; and d. a mixer for combining the output signals of said low pass filter and said signal clipping circuit.

2. A noise eliminating circuit according to claim 1, wherein said synchronous denoting signals are horizontal synchronous signals in horizontal blanking periods of said video television signals and said clipping circuit clips a negative going overshoot pulse in said horizontal blanking periods.

3. A noise eliminating circuit according to claim 1, wherein said clipping circuit includes means for variably controlling the clipping level thereof.

4. A noise eliminating circuit according to claim 3, wherein the high frequency component of the output of said mixer is improved so as to achieve an aperture correction of said signals.

5. A noise eliminating circuit according to claim 1 further comprising a noise limiter which is connected between said high pass filter and said clipping circuit.

6. A noise eliminating circuit for a demodulated video signal which includes blanking intervals with a synchronizing signal in each blanking interval and an overshoot noise directed toward the black level side of the video signal at the front porch of each blanking interval, said circuit comprising: low pass filter means for separating a low frequency band component from said video signal; high pass filter means for separating a high frequency band component from said video signal; clipping circuit means receiving said high frequency band component and clipping from the latter black peak signals exceeding a predetermined black signal level so as to substantially remove said overshoot noise; and mixing means combining said low frequency band component with the output of said clipping circuit means so as to reconstitute therefrom a video signal devoid of said overshoot noise.

7. A noise eliminating circuit according to claim 6; in which said clipping circuit means includes adjustable means for varying the clipping level thereof, said low pass filter provides said low frequency band component with a curved characteristic at said front porch of each blanking interval, and said clipping level is selected by said adjustable means so that a vestige of said overshoot noise remains in said output of the clipping circuit means to cancel said curved characteristic and provide the reconstituted video signal from said mixing means with a flat characteristic at said front porch.

8. A noise eliminating circuit according to claim 7; in which said high pass filter provides said high frequency band component with overshoot noises directed toward the white level which are unaffected by said clipping circuit means and therefore included in said reconstituted video signal during each picture period between successive blanking intervals for accentuating the contours of a picture produced from said reconstituted video signal.

* * * * *